United States Patent [19]

Fujiwara et al.

[11] Patent Number: 4,622,828
[45] Date of Patent: Nov. 18, 1986

[54] AIR-CONDITIONING AND REFRIGERATING SYSTEM

[75] Inventors: Kenichi Fujiwara, Kariya; Eiichi Hasada, Okazaki; Hikaru Sugi, Nagoya, all of Japan

[73] Assignee: Nippondenso Co., Ltd., Kariya, Japan

[21] Appl. No.: 783,160

[22] Filed: Oct. 2, 1985

Related U.S. Application Data

[62] Division of Ser. No. 643,382, Aug. 23, 1984, Pat. No. 4,565,072.

[30] Foreign Application Priority Data

Aug. 25, 1983 [JP] Japan .................. 58-155899

[51] Int. Cl.⁴ .............................. F25B 5/00
[52] U.S. Cl. ....................... 62/200; 62/244; 62/510
[58] Field of Search .......... 62/196.2, 199, 200, 62/244, 510

[56] References Cited

U.S. PATENT DOCUMENTS

| | | | |
|---|---|---|---|
| 2,123,497 | 7/1938 | Buchanan | 62/200 |
| 2,333,899 | 11/1943 | Stickel | 62/200 X |
| 2,481,605 | 9/1949 | MacLeod | 62/200 |

Primary Examiner—Harry Tanner
Attorney, Agent, or Firm—Cushman, Darby & Cushman

[57] ABSTRACT

An air-conditioning and refrigerating system has a single vane-type rotary compressor, a single condenser, an air-conditioning evaporator and a refrigerating evaporator parallel to the air-conditioning evaporator. The compressor has main and auxiliary suction ports connected through air conditioning and refrigerating refrigerant return passages to the air-conditioning evaporator and to the refrigerating evaporator, respectively. The compressor is constructed such that the refrigerating refrigerant returned through the auxiliary suction port into a working chamber is mixed in the working chamber with the air-conditioning refrigerant returned through the main suction port into the working chamber before the refrigerating refrigerant is compressed in the working chamber.

3 Claims, 11 Drawing Figures

AIR-CONDITIONING AND REFRIGERATING SYSTEM

This is a division of application Ser. No. 643,382, filed Aug. 23, 1984, U.S. Pat. No. 4,565,072.

BACKGROUND OF THE INVENTION

1. Field of the Invention

The present invention relates to an air-conditioning and refrigerating system for use, but not restrictively, with an automobile.

2. Description of the Prior Art

In the past, an air-conditioning system and a refrigerating system for cooling soft drinks or the like, both mounted on an automobile, had independent refrigeration cycles. The two independent refrigeration cycles utilize separate compressors and condensers. The two condensers need their heat radiation spaces which cannot easily be found within a relatively narrow or compact automobile. In additon, the cost of manufacture is increased because of the two independent refrigeration cycles.

SUMMARY OF THE INVENTION

It is an object of the present invention to provide an improved and compact air-conditioning and refrigerating system.

The air-conditioning and refrigerating system according to the present invention includes a single compressor, a single condenser, an air-conditioner circuit and a refrigerator circuit both connected at their inlet ends to the single condenser so that the two circuits are in parallel relationship to each other. The circuits include air-conditioner evaporator and a refrigerator evaporator, respectively, and are respectively connected at the outlet ends to main and auximilary suction ports provided in the compressor. When the refrigerator circuit is not in use, the auxiliary suction port in the compressor can be connected to the air-conditioner circuit to increase the capacity of the air-conditioner.

The above and other objects, features and adantages of the present invention will be made more apparent by the following description with reference to the accompanying drawings.

DESCRIPTION OF PREFERRED EMBODIMENTS

Figure 1:
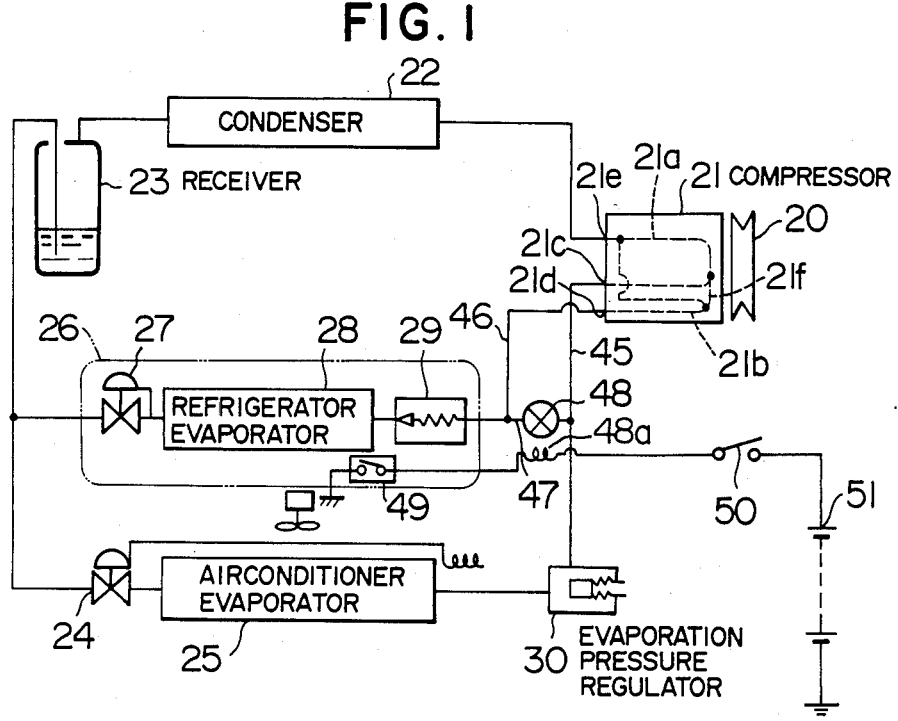
FIG. 1 is a diagrammatic illustration of an embodiment of the air-conditioning and refrigerating system according to the present invention.

The embodiment of the air-conditoining and refrigerating system shown in FIG. 1 is designed for use with an automobile and, for this purpose, includes an electromagnetic clutch 20 adapted to be controlled to selectively drivingly connect an output shaft of an automotive engine (not shown) to a refrigerant compressor 21 which is an element of the system shown in FIG. 1. The compressor 21 is of a swash plate axial piston type and has ten cylinders, the nine cylinders of which form a main compression section 21a and the remaining one cylinder of which forms an auxiliary compression section 21b. The main and auxiliary compression sections 21a and 21b have main suction port 21c and an auxiliary suction port 21d, respectively, and are communicated with each other by means of a communication passage 21f which will be described in further detail later. The communication passage assures that, when the compressor 21 is in operation, the main and auxiliary compression sections 21a and 21b compress the refrigerant to the same pressure level even when the refrigerant pressures at the main and auxiliary suction ports 21c and 21d are at different pressure levels. The parts of the refrigerant compressed by the main and auxiliary compression sections 21a and 21b are discharged through a common discharge port 21e.

As described above, the auxiliary compression section 21b of the compressor 21 is of a displacement capacity which is much smaller than that of the main compression section 21a. In addition, because the main and auxiliary compression sections 21a and 21b have independent suction ports, the main and auxiliary compression sections can have their suction ports connected to refrigerant circuits at different pressure levels. Accordingly, the main and auxiliary suction ports 21c and 21d can be connected respectively to an evaporator of an air-conditioner circuit and to a second evaporator of a refrigerator circuit so that the evaporation pressure in the refrigerator evaporator is set to be of a level lower than that in the air-conditioner evaporator. Therefore, the temperature of the refrigerant in the refrigerator evaporator can be lowered beyond the refrigerant temperature in the air-conditioner evaporator. For example, the refrigerant temperature in the air-conditioner evaporator should not be lower than 5° C. in order to prevent the occurence of frost. To the contrary, the refrigerant in the refrigerator evaporator may be at a pressure level of, for example, 0.5 kg/cm$^2$, and at a temperature level of $-21°$ C. to assure that the refrigerator is capable of producing ice.

The auxiliary compression section 21b is communicated by the communication passage 21f with the main compression section 21a just prior to the start of the compression operation of the auxiliary compression section. Accordingly, the auxiliary compression section 21b starts its compression stroke with the refregerant pressure therein being at approximately 2.5 kg/cm$^2$. This will greatly increase the amount of refrigerant discharged from the auxiliary compression section, with a result that the air-conditioner circuit can be fed with compressed refrigerant at a rate substantially eqaul to a rate obtainable from the operations of nine cylinders and a half, whereby the reduction in the air-conditioner capacity, which is otherwise caused by a simultaneous operation of the refrigerator, can be minimized.

The discharge port 21e of the compressor 21 is connected to a condenser 22 having its discharge side connected to a receiver 23 whose discharge side is connected to an air-conditioner circuit which includes a pressure reduction means in the form of a temperature-sensitive expansion valve 24, an air-conditioner evaporator 25 connected to the downstream side of the valve 24 and an evaporation pressure regulating valve 30 having its upstream side connected to the discharge port of the evaporator 25. The downstream side of the evaporation pressure regulating valve 30 is connected through an air-conditioning refrigerant pipe line 45 to the main suction port 21c of the refrigerant compressor 21.

The discharge side of the receiver 23 is also connected to a refrigerator circuit disposed in parallel relationship to the air-conditioner circuit. The refrigerator circuit includes a refrigerator evaporation section 26 comprising pressure reduction means in the form of a constant pressure expansion valve 27, a refrigerator evaporator 28 connected to the downstream side of the valve 27 and a check valve 29 disposed at the downstream side of the evaporator 28. The check valve 29 has its downstream side connected through a refrigerating refrigerant pipe line 46 to the auxiliary suction port 21d of the refrigerant compressor 21. The check valve 29 is operative to permit the flow of refrigerant gas in only one way, i.e., from the refrigerator evaporator 28 toward the compressor 21. The constant pressure expansion valve 27 is adapted to be automatically opened when the pressure on the downstream side of the valve 27, i.e., the refrigerant pressure in the refrigerator evaporator 28, is lowered below a predetermined level, such as 0.5 kg/cm², for example.

The air-conditioning refrigerant pipe line 45 and the refrigerating refrigerant pipe line 46 are connected by a communication pipe line 47 on which is disposed a solenoid-operated valve 48 adapted to be closed when electrically energized to interrupt the communication between the two refrigerant pipe lines 45 and 46. The refrigerator evaporator 28 is enclosed by a conventional refrigerator housing (not shown) in which is mounted a lead switch 49 which is sensitive to the temperature condition within the refrigerator and adapted to be automatically closed when the refrigerator temperature is lowered to a pre-set level (for example, 5° C.). The switch 49 is sereis-connected to a refrigerator operation switch 50 which in turn is connected to a power source which, in the illustrated embodiment of the invention, is formed by a battery 51 mounted on an associated automobile. An exciting coil 48a of the solenoid valve 48 is sereis-connected to the switches 49 and 50. The arrangement is such that the valve 48 is closed when the switches 49 and 50 are both closed.

Figure 2:
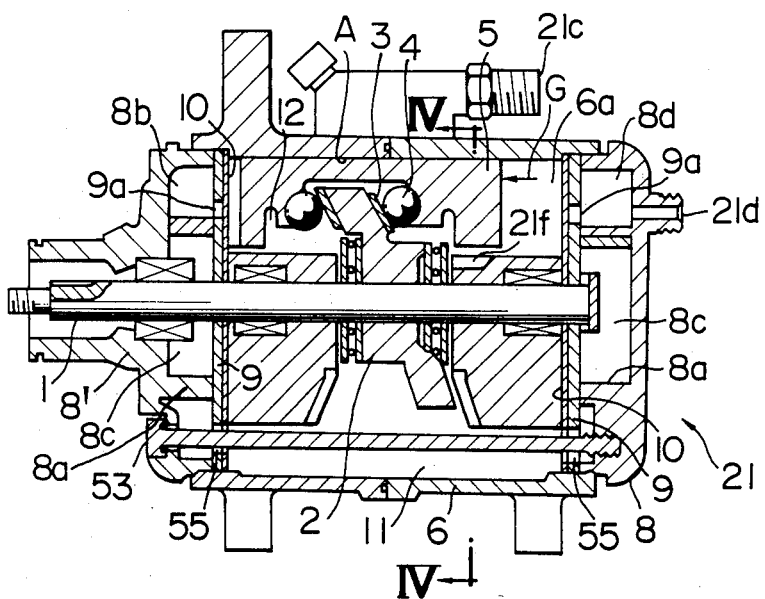
FIG. 2 is an anlarged axial sectional view of the compressor shown in FIG. 1.
Figure 3:
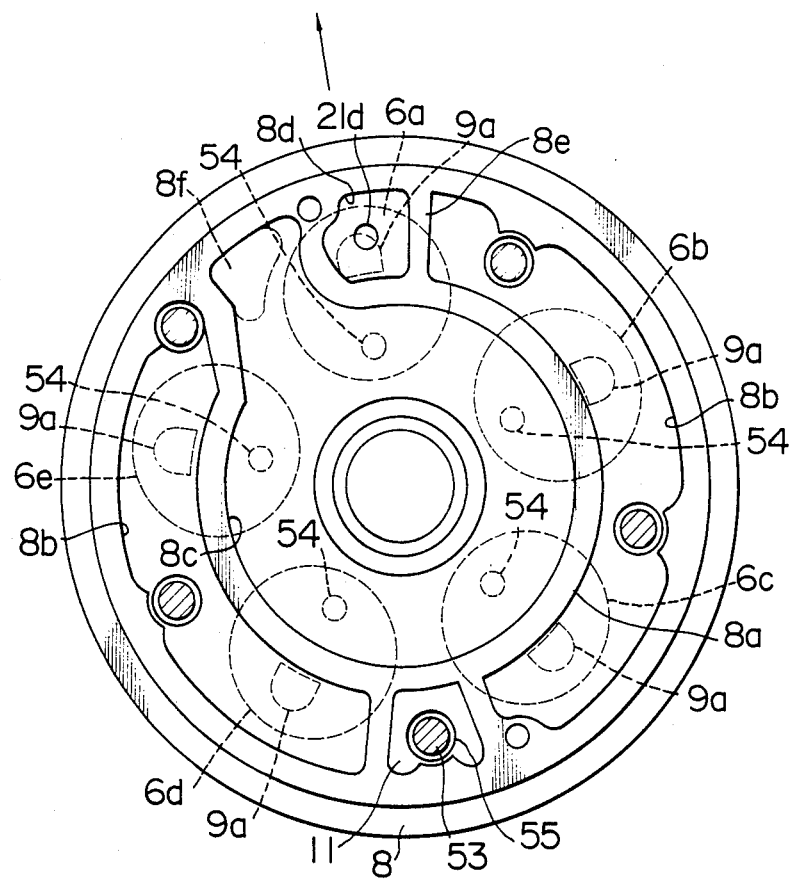
FIG. 3 is an enlarged end view of a compressor end plate as viewed from the side of a compressor cylinder block.
Figure 4:
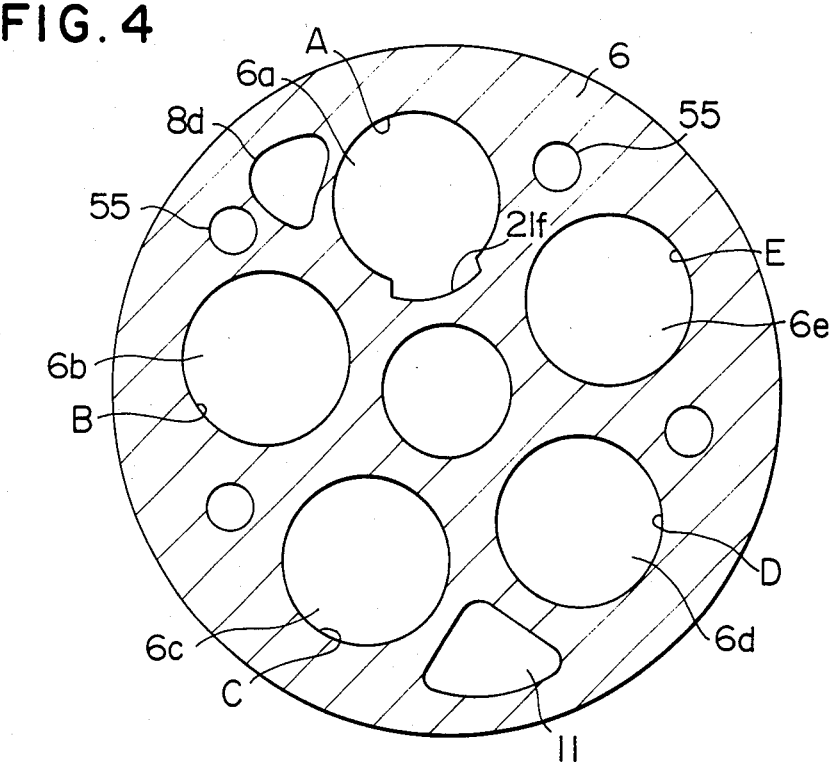
FIG. 4 is an enlarged sectional view of the cylinder block taken along line IV—IV in FIG. 2.

The structural details of the refrigerant compressor 21 are shown in FIGS. 2 to 4. In the illustrated embodiment of the invention, the compressor 21 is of swash plate axial piston type having a shaft 1 adapted to be drivingly connected through the electromagnetic clutch 20 (FIG. 1) to an output shaft of an automotive engine (not shown). A swash plate 2 is secured to the shaft 1 for rotation therewith. The rotation of the swash plate 2 is transmitted through shoes 3 and balls 5 to five double-headed pistons 5 (only one of which is shown in FIG. 2) having peripheral surfaces coated with a plastic material, such as polytetrafluoroethylene available under the trade name of Teflon. The five pistons 5 are axially reciprocally disposed in five cylindrical bores A–E formed in a cylinder block 6, as best shown in FIG. 4. These bores A–E coooperate with the opposite heads or end faces of the five pistons to define ten cylinders, one of which is shown at 6a in FIG. 2 and five of which are shown at 6a–6e in FIG. 3. The cylinder block 6 defines therein a central axial bore through which the shaft 1 extends rotatably. The cilinder block 6 is also formed therein with a swash plate chamber 12 which accomodates the swash plate 2 and is communicated with the cylindrical bores A–E, as will be seen in FIG. 2. Each of the pistons 5 is drivingly connected by the balls 4 and the shoes 3 to the swash plate 2 in the manner shown in FIG. 2. An oil chamber 11 is formed in the cylinder block 6 and axially extends therethrough. Housing members or end plates 8 and 8' are secured to the opposite ends of the cylinder block 6 with an annular valve plate 9 and a suction valve 10 of a resilient sheet metal being sandwiched between each end of the cylinder block 6 and an associated end plate 8 or 8'. The component parts 8, 8', 9 and 10 are secured together by means of a plurality of circumferentially spaced and axially extending tie bolts 53, only one of which is shown in FIG. 2. The valve plates 9 are formed therein with suction ports 9a disposed in axial alignment with the ten cylinders, respectively.

The two end plates 8 and 8' are similar in structure with the exception that the end plate 8' is formed therein with a central axial opening through which the shaft 1 rotatably extends whereas the other end plate 8 is provided with the auxiliary suction port 21d. Each of the end plates 8 and 8' is of a generally dish-like structure having a generally circular and axially inwardly extending partition wall 8a which defines therein a discharge chamber 8c and cooperates with a peripheral wall to define a suction chamber 8b. The end plate 8 is further distinguished from the end plate 8' in that the end plate 8 is provided with a second partition wall 8e which cooperates with the peripheral wall and with the partition wall 8a to define an auxiliary suction chamber 8d which is separated from the suction chamber 8b and communicated directly with the auxiliary suction port 21d, as will be seen FIGS. 2 and 3. Each of the valve plates 9 is formed therein with the suction ports 9a, as mentioned previously, and is further provided with discharge ports 54 (see FIG. 3) adapted to be opened and closed by discharge valves (not shown) to discharge compressed refrigerant into the discharge chamber 8c. It will be noted that, although the suction port 9a which is aligned with the cylinder 6a is communicated with the auxiliary suction chamber 8d, the discharge port 54 which is also aligned with the cylinder 6a is communicated with the common discharge chamber 8c.

From the foregoing description, it will be understood that the cylinder 6a forms the previously mentioned auxiliary compression section 21b while the other nine cylinders form the main compression section 21a. The main suction port 21c is provided on the outer peripheral wall of the cylinder block 6, as shown in FIG. 2, and is communicated with the swash plate chamber 12 which in turn is communicated with the lefthand and righthand suction chambers 8b through passages defined between the bolts 53 and bolt holes 55. The refrigerant can then be sucked from the suction chambers 8b through the suction ports 9a into all the cylinders except the cylinder 6a. The refrigerant from the auxiliary suction port 21d flows through the auxiliary suction chamber 8d and through the associated suction port 9a into the cylinder 6a.

When the head of the piston 5 in the cylinder 6a is moved nearly to its bottom dead center, the cylinder 6a is communicated with the swash plate chamber 12 by the previously mentioned communication passage 21f which, in the illustrated embodiment of the invention, is in the form of a slit defined between the inner peripheral wall of the cylinder 6a and the periphery of the head of the piston 5 disposed in the cylinder 6a, as will be ssen in FIG. 2. For this purpose, the inner peripheral wall of the cylinder 6a is formed therein with an axially extending recess or groove which is shown in FIG. 4 at 21f and which is generally arcuate as viewed in section taken transversely of the axis of the cylinder 6a. The cross-sectional area of the groove 21f can be appropriately selected and may extend all over the entire periphery of the cylinder 6a.

When the auxiliary compression section, i.e., the cylinder 6a, is in its suction stroke, the piston 5 in the cylinder 6a is moved in the direction indicated by an arrow G in FIG. 2 to suck the low pressure refrigerant at a pressure level of 0.5 kg/cm² from the auxiliary suction chamber 8d into the cylinder 6a. When the piston head reaches the slit 21f, the cylinder 6a is communicated through the slit 21f with the swash plate chamber 12, so that the high pressure refrigerant at a pressure level of 2.5 kg/cm² in the swash plate chamber 12 flows therefrom through the slit 21f into the cylinder 6a due to the pressure difference therebetween.

Figure 6:
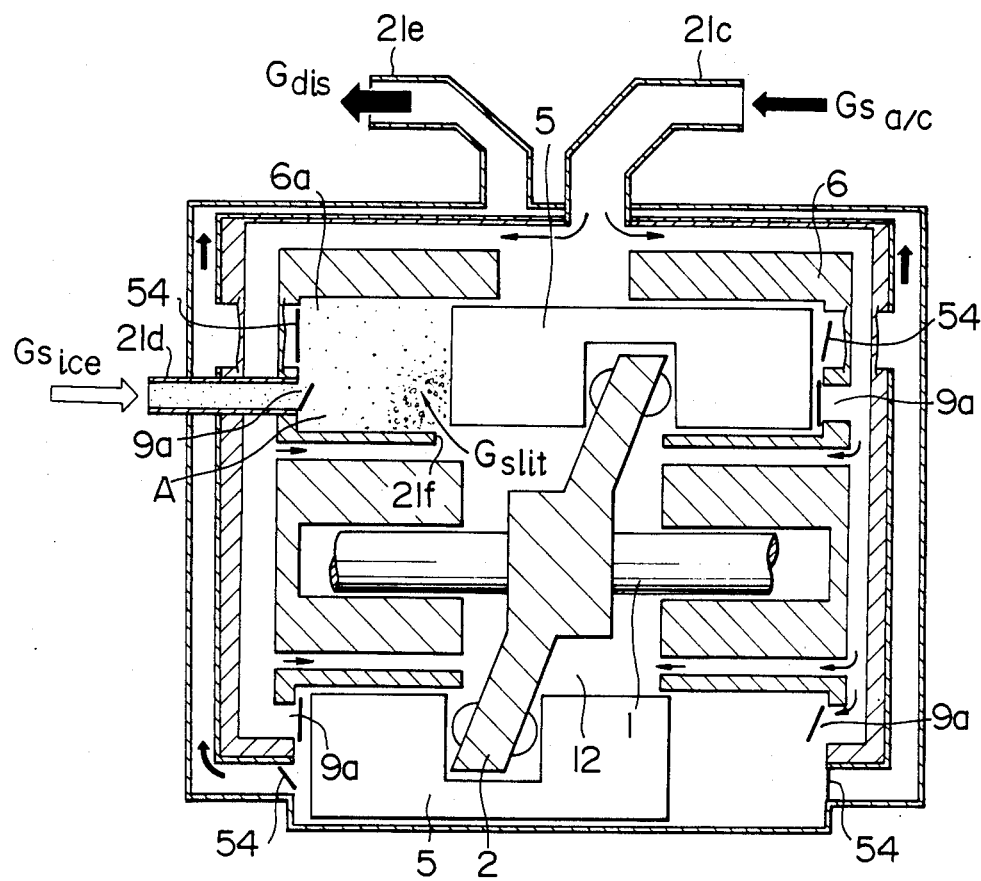
FIG. 6 is a schematic illustration of the operation of the compressor of the embodiment shown in FIGS. 1-4.

FIG. 6 schematically illustrates the flow of the high pressure refrigeant from the swash plate chamber 12 into the cylinder 6a. The arrow "Gs$_{a/c}$" indicates the flow of the air-conditioning higher pressure refrigerant at 2.5 kg/cm², the arrow "Gs$_{ice}$" indicates the flow of the refrigerating lower pressure refrigerant at 0.5 kg/cm², the arrow "G$_{dis}$" indicates the flow of the compressed refrigerant which is discharged from the compressor 21 through the discharge port 21e, and the arrow "G$_{slit}$" indicates the flow of the higher pressure refrigerant from the swash plate chamber 12 into the cylinder 6a through the slit 21f. Because of this flow "G$_{slit}$" from the swash plate chamber 12 through the slit 21f into the cylinder 6a, the refrigerant pressure in the cylinder 6a rises from 0.5 kg/cm² to 2.5 kg/cm² before the piston 5 in the cylinder 6a starts its compression stroke.

Assuming that the quantity of the higher pressure refrigerant introduced from the swash plate chamber 12 into the cylinder 6a is represented by "V$_{slit}$", this quantity is given by:

$$V_{slit} = (\gamma_{g\,a/c} - \gamma_{g\,ice}) \cdot V$$

where "$\gamma_{g\,a/c}$" represents the specific weight of the higher pressure refrigerant at 2.5 kg/cm² in the swash plate chamber 12, "$\gamma_{g\,ice}$" represents the specific weight of the lower pressure refrigerant at 0.5 kg/cm² and "V" is the volume of the cylinder 6a. In the case where the refrigerant used is R-12, the quantity V$_{slit}$ will amount to approximately 10.7V. On the other hand, a quantity V$_{a/c}$, which is the amount of the air-conditioning refrigerant sucked into each of the cylinders of the main compression section 21a will amount to approximately 19.6V.

Thus, although one cylinder 6a is used for the refrigeration purpose and the remaining nine cylinders are for the air-conditioning purpose, the quantity V$_{slit}$ is added to the refrigerant compressed and discharged from the air-conditioning nine cylindrs. Accordingly, the number M of the air-conditioning cylinders, in effect, is given by:

$$M = (9\,V_{a/c} + V_{slit})/V_{a/c}$$
$$= 9 + V_{slit}/V_{a/c}$$
$$= 9 + 10.7\,V/19.6\,V$$
$$\approx 9.6$$

As such, the effective number of the air-conditioning cylinders is increased by 0.6 cylinder.

The refrigerant compressed not only in the auxiliary compression section, i.e., the cylinder 6a, but also in the main compression sections 21a, i.e., the other nine cylinders, becomes a high pressure refrigerant, which is at about 15 kg/cm², is discharged through the discharge valves (not shown) and the discharge ports 54 into the discharge chambers 8c which are interconnected by a connecting passage 8f shown in FIG. 3. The common discharge port 21e is connected to one of the discharge chambers 8c so that the compressed refrigerant can be discharged through the discharge port 21e toward the condenser 22.

Figure 5:
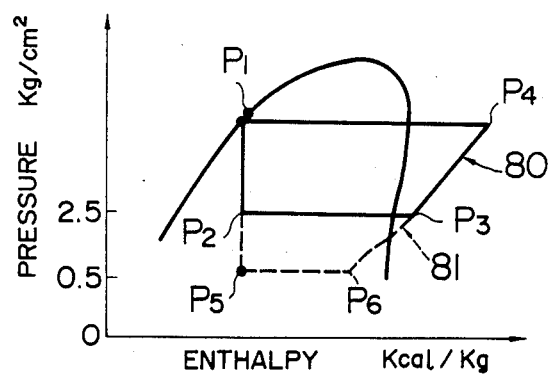
FIG. 5 is a Mollier chart.

The operation of the described embodiment of the invention will be described with reference to FIG. 1 and also to FIG. 5 which is a Mollier charge wherein a solid line 80 represents the condition of the refrigerant in the refrigeration cycle for the air-conditioner, while a broken line 81 represents the condition of the refrigerant in the refrigeration cycle for the refrigerator. When the coil of the electromagnetic clutch 20 is energized to cause the clutch to drivingly connect the engine to the refrigerant compressor 21, the compressor starts its refrigerant compression operation.

At this time, if the refrigerator switch 50 is turned on and if the temperature within the refrigerator is higher than 5° C., the solenoid valve 48 is closed, so that the flows of the refrigerant through the air-conditioner evaporator 25 and through the refrigerator evaporator 28 are returned respectively through the refrigerant return pipe lines 45 and 46 to the main and auxiliary suction ports 21c and 21d of the compressor 21. The cylinder 6a of the auxiliary compression section 21b is communicated through the communication passage or slit 21f with the main compression section 21a when the cylinder 6a is in the final stage of its suction stroke, so that the refrigerant pressure in the cylinder 6a will rise from P$_6$ to P$_3$ (FIG. 5). Accordingly, the main and auxiliary compression sections 21a and 21b are caused to compress compressed charges of refrigerant all at the same pressure level of 2.5 kg/cm². The compressed charges of the refrigerant are all mixed together and discharged from the compressor 21 through the discharge port 21e into the condenser 22 in which the refrigerant is liquefied (see line from P$_4$ to P$_1$ in FIG. 5).

The liquefied refrigerant is accumulated in the receiver 23 and subjected to the operations of the constant pressure expansion valve 27 and the temperature responsive expansion valve 24 (see lines from P$_1$ to P$_5$ and from P$_1$ to P$_2$ in FIG. 5) and evaporated in the refrigerators 28 and 25 (lines P$_5$-P$_6$ and P$_2$-P$_3$). The evaporation pressure regulating valve 30 disposed downstream of the air conditioner evaporator 25 is operative to keep the mean value of the evaporation pressure within the evaporator 25 above 2 kg/cm² so as to prevent the occurence of frost on the fins of the evaporator 25. The point P$_1$ in FIG. 5 represents the condition of the refrigerant upstream of the temperature responsive expansion valve 24, the point $P_2$ representing the condition of the refrigerant downstream of the expansion valve 24, the point $P_3$ representing the condition of the refrigerant at the main suction port 21c of the compressor 21, and the point $P_4$ representing the condition of the refrigerant at the discharge port 21e of the compressor 21. The constant pressure expansion valve 27 of the refrigerator circuit is adjusted such that the refrigerant downstream of the valve 27 is in the condition represented by $P_5$. More specifically, the constant pressure expansion valve 27 is operative to maintain the evaporation pressure of the refrigerator evaporator 28 at a level of 0.5 kg/cm$^2$. This level of the evaporation pressure of the evaporator 28 is sufficient to keep the refrigerant temperature in the evaporator 28 at a level of $-21°$ C. which is low enough to enable the refrigerator to produce ice therein.

When the temperature in the refrigerator is lowered to a level below a predetermined temperature level (for example, 5° C.), the lead switch 49 is opened to deenergize the coil of the solenoid valve 48, so that the communication pipe line 47 communictes the air-conditioning and refrigerating refrigerant return pipe lines 45 and 46. Accordingly, the refrigerant flowing out of the air-conditioner evaporator 25 passes not only through the pipe line 45 to the main suction port 21 of the main compression section 21a of the compressor 21 but also through the pipe lines 47 and 46 to the auxiliary suction port 21d of the auxiliary compression section 21b, whereby all of th ten cylinders of the compressor 21 are now rendered operative solely for the purpose of air-conditioning. The check valve 29 prevents the flow of the higher pressure refrigerant from the higher pressure refrigerant pipe line 45 into the refrigerator evaporator 28. At the same time, if the pressure in the refrigerator evaporator 28 tends to rise, the constant pressure expansion valve 27 closes the inlet of the refrigerator circuit. As such, the two valves 27 and 29 are operative to keep the refrigerant pressure in the refrigerator at a predetermined low level so that the temperature in the refrigerator is kept at a low level for a certain period of time.

As in the conventional air conditioner, various signals are utilized to control the operation of the compressor 21 so that the compressor is operated intermittently, although this point is not a part of the invention and will not be described in detail herein. If the compressor operation is intermitted by such an intermittent operation control, the refrigerant pressure in the air-conditoner evaporator 25 will rise gradully. However, for the reason described in the preceding paragraph, the refrigerant pressure in the refrigerator evaporator 28 will be prevented from being raised.

The present invention is not limited to the embodiment described above but may have various modifications as follows:

(1) The auxiliary compression section 21b of the compressor 21 may be formed by an increased number of cylinders. For example, two cylinders may be used for the refrigeration purpose while the eight cylinders may be utilized for the air-conditioning. The increase in the capacity of the auxiliary compression section of the compressor 21 will increase the capacity of the refrigerator. In such a case, the refrigerator can be used for a refrigerator car.

(2) The compressor 21 may be modified such that all of the cylinders are provided with the slits 21f, that the refrigerating low pressure refrigerant from the auxiliary suction port 21d is introduced into all of the cylinders and that the air-conditioning high pressure refrigerant is introduced from the main suction port 21c into the swash plate chamber 12. Such a modified compressor is capable of providing a refrigeration operation at about $-20°$ C. and an air-conditioning operation.

Figure 7:
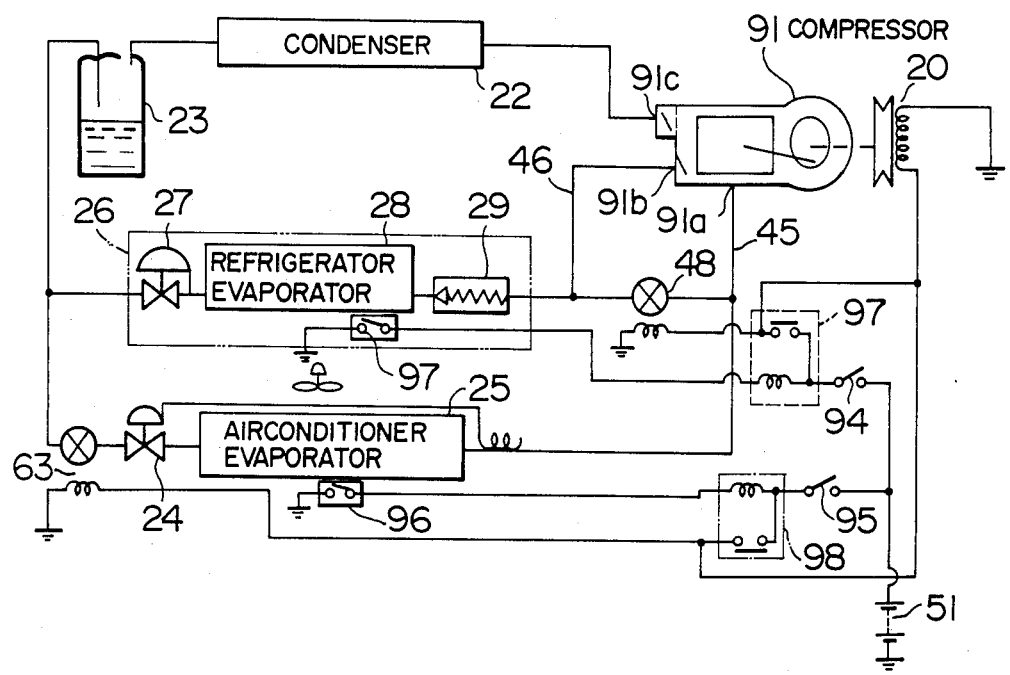
FIG. 7 is a diagrammatic illustration of a modification of the embodiment shown in FIGS. 1-4.

Such a modified compressor 91 is utilized in an embodiment shown in FIG. 7, wherein the comrpessor 91 has a main suction port 91a communicated with the swash plate chamber to introduce the air-conditioning refrigerant thereinto, and an auxiliary suction port 91b connected to all of the cylinders to introduce the refrigerating refrigerant thereinto. Thus, the refrigerating low pressure (0.5 kg/cm$^2$) refrigerant sucked into each of the cylinders is mixed with the air-conditioning high pressure (2.5 kg/cm$^2$) refrigerant in the final stage of the suction stroke of the cylinder, so that all the cylinders start their compression strokes with the starting pressure of 2.5 kg/cm$^2$.

As will be seen in FIG. 7, a blower is disposed on one side of the air-conditioner evaporator 25 so that air flows through the evaporator in heat exchange relationship with the refrigerant therein. In order to prevent the occurence of frost on the evaporator 25, a lead switch 96 is disposed on the other side of the evaporator and electrically connected to a relay 98. The lead switch 96 has a hysteresis characteristic by which the switch is opened at 1° C. and closed at 2° C. A solenoid-operated valve 63 is disposed in the air-conditioning circuit upstream of the expansion valve 24. An air-conditioner switch 95 is disposed in an electric circuit between the relay 98 and the battery 51. The relay is responsive to the switching operations of the switches 95 and 96 to control the operations of the electromagnetic clutch 20 and the solenoid valve 63 such that, when the air-conditioner switch 95 and the switch 96 are both turned on, the contact point of the relay 98 is closed to electrically energize the electromagnetic clutch 20 and to open the solenoid valve 63 and such that, when one of the two switches 95 and 96 is turned off, the electromagnetic clutch 20 is deenergized and the valve 63 is closed.

The temperature in the refrigerator chamber is detected by a second lead switch 97 which has a hysteresis characteristic and is opened at less than $-18°$ C. and closed at more than $-16°$ C. The switch 97 is electrically connected to a relay 97 which is electrically connected to the solenoid valve 48 and the electromagnetic clutch 20. A refrigerator operation switch 94 is disposed in the electric circuit upstream of the relay.

Thus, the relay 97 is responsive to the switching operations of the two switches 94 and 97 to control the solenoid valve 48 and the electromagnetic clutch 20.

(3) The constant pressure expansion valve 27 which forms the pressure reduction means in the refrigeration circuit may alternatively be a conventional temperature-responsive expansion valve or a combination of a solenoid-operated valve and a fixed restriction.

(4) The lead switch 49 (FIG. 1) or 97 (FIG. 7) for detecting the temperature in the refrigerator may alternatively detect the surface temperature of the refrigerator evaporator 28. The lead switch 49 or 97 may be replaced by a temperature-sensitive element such as a thermistor and an associated electric circuit which cooperate together to control the solenoid valve 48. Further alternatively, the evaporation pressure in the evaporator 28 may be detected in place of the temperature thereof.

(5) The present invention may also be applied to a domestic air-conditioning and refrigerating system.

(6) The compressor used in the system according to the present invention is not limited to such a multicylinder swash plate axial piston type as used in the described embodiments and can be of such a vane type as is schematically shown in FIGS. 8-11, wherein a vane type compressor 61 has a rotor 70 on which two vanes 71 and 72 are mounted at angular intervals of about 90°. When the rotor 70 is rotated in a direction indicated by H, the two vanes 71 and 72 are angularly moved in sliding contact with the inner peripheral surface 73 of the compressor to suck, compress and discharge the refrigerant.

Figure 8:
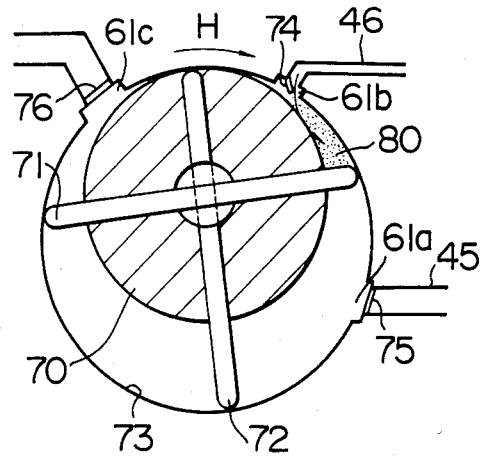
FIGS. 8-11 are schematic sectional views of a rotary compressor of another embodiment of the invention, the compressor being shown in its different operation phases.

FIG. 8 illustrates a first stage of an intake stroke in which an auxiliary suction valve 74 is opened to permit a refrigerating low pressure (0.5 kg/cm$^2$) refrigerant to be sucked from a refrigerating refrigerant return pipe line 46 through an auxiliary suction port 61b into a working chamber 80.

Figure 9:
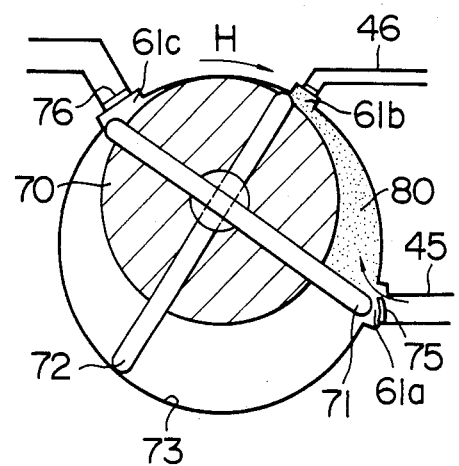

FIG. 9 illustrates a second stage of the intake stroke in which the first vane 71 reaches a main suction port 61b, a main suction valve 75 is opened to permit an air-conditioning high pressure (2.5 kg/cm$^2$) refrigerant to be sucked from an air-conditioning refrigerant return pipe line 45 through a main suction port 61a into the working chamber 80. The air-conditioning refrigerant thus sucked is mixed with the refrigerating low pressure refrigerant in the working chamber 80 to form a refrigerant mixture at 2.5 kg/cm$^2$ which is high enough to close the auxiliary suction valve 74, as shown in FIG. 9.

Figure 10:
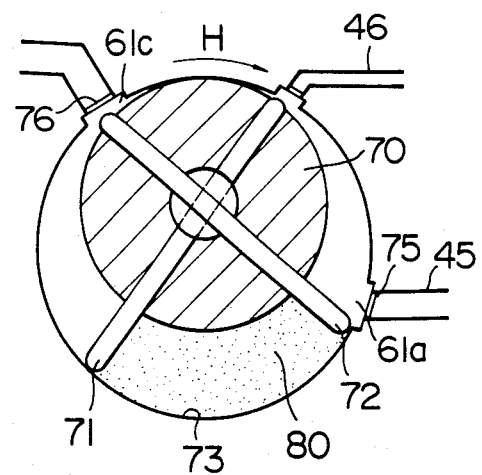
Figure 11:
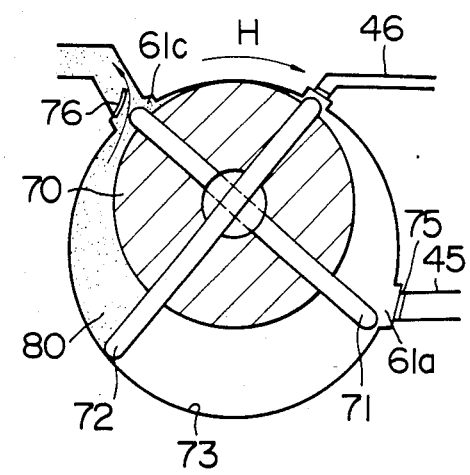

Then, the second vane 72 is moved past the main suction port 61a, as shown in FIG. 10. Since this time, the volume of the working chamber 80 is gradually reduced as the rotor 70 is rotated, whereby the refrigerant in the chamber 80 is subjected to compression.

When the first vane 71 reaches a discharge port 61c, a discharge valve 76 is opened to allow the compressed refrigerant to be discharged from the working chamber 80 through the discharge port 61c.

As will be apparent from the foregoing description, the refrigerant compressor is provided with a main suction port for the air-conditioning high pressure refrigerant and an independent auxiliary suction port for the refrigerating low pressure refrigerant. Thus, the air-conditioning and refrigerating system of the invention can include a refrigerating circuit having a refrigerator evaporator the evaporation pressure of which is lower than that of the air-conditioner evaporator. In other words, the two independent, air-conditioning and refrigerating operations can be achieved with a single refrigerant compressor, whereby any additional or separate compressor and condenser which have been required for the refrigerator can be eliminated by the present invention. This is quite advantageous from the view point of mounting space particularly in an automobile.

In addition, according to the present invention, high and low pressure charges of refrigerant sucked through independent main and auxiliary suction ports into a single compressor are mixed together to form a high pressure mixture just prior to a compression stroke. Thus, the mixture is subjected to compression stroke which starts with the high pressure level. Compared with the case where the refrigerating low pressure refrigerant and the air-conditioning high pressure refrigerant are independently or separately compressed, the case with the present invention in which the mixture of the high and low pressure refrigerants is subjected to compression provides an advantage that the discharge of the compressed refrigerant is increased by the difference in pressure between the refrigerating and air-conditioning refrigerants.

What is claimed is:

1. An automotive air-conditioning and refrigerating system for cooling air in an occupant room of an automobile and also cooling a space in a refrigerator mounted on the automobile, said system including:

a rotary refrigerant compressor provided with a main suction port, an auxiliary suction port and a discharge port through which the refrigerant is discharged in compressed gas phase said compressor including a housing defining therein a cylindrical chamber, a rotor rotatably mounted in said cylindrical chamber and a plurality of vanes mounted on said rotor for rotation therewith such that the vanes are moved in sliding contact with the inner peripheral surface of said cylindrical chamber, said housing, rotor and vanes cooperating together to define a plurality of working chambers each having a volume which is varied as said rotor and vanes are rotated, said main and auxiliary suction ports being formed in said housing;

a condenser having an intake side operatively connected to said discharge port of said compressor and adapted to condense the gas-phase refrigerant into liquid-phase refrigerant;

an air-conditioning circuit including a first pressure reducing means operative to expand the liquid-phase refrigerant into atomized air-conditioning refrigerant and an air-conditioner evaporator operative to evaporate the atomized refrigerant at a first evaporation pressure so that air surrounding said evaporator is cooled to air condition said occupant room;

a refrigerating circuit disposed in parallel relationship to said air-conditioning circuit and including a second pressure reducing means operative to expand the liquid-phase refrigerant into atomized refrigerating refrigerant, a refrigerator evaporator operative to evaporate the atomized refrigerating refrigerant at a second evaporation pressure lower than said first evaporation pressure so that said refrigerator functions to cool said space in said refrigerator;

an air-conditioning refrigerant return passage connecting said air-conditioning evaporator to said main suction port of said compressor; and a refrigerating refrigerant return passage connecting said refrigerator evaporator to said auxiliary suction port of said compressor;

said main and auxiliary suction ports being positioned such that the refrigerating refrigerant is first sucked through said auxiliary suction port into a working chamber in a first stage of a suction stroke thereof and the air-conditioning refrigerant is sucked through said main suction port into the working chamber in a second stage of the suction stroke, said second stage being later than said first stage;

said compressor being constructed such that the evaporated lower-pressure refrigerating refrigerant returned to said auxiliary suction port is mixed in said compressor with the evaporated higher-pressure air-conditioning refrigerant returned to said main suction port before said lower-pressure refrigerating refrigerant is compressed in said compressor to a predetermined pressure level and such that said main suction port is disposed at a position where the volume of the working chamber is being increased whereby said higher-pressure air-conditioning refrigerant is not only allowed to flow into the working chamber, when said main suction port is opened to the working chamber, due to the difference in pressure between the lower-pressure refrigerating refrigerant already sucked into the working chamber and the higher-pressure air-conditioning refrigerant returned to said main suction port, but also sucked into the working chamber due to continued increase in the volume of the working chamber caused by the rotation of the rotor subsequent to the opening of the main suction port to the working chamber.

2. An air-conditioning and refrigerating system according to claim 1, further including a communication passage extending between said air-conditioning and refrigerating refrigerant return passages and a valve means adapted to control the communication between said refrigerant return passages through said additional communication passage.

3. An air-conditioning and refrigerating system according to claim 2, further including a sensor for detecting the temperature related to the operation of said refrigerator evaporator, said temperature sensor being operatively associated with said valve means, the arrangement being such that, when the temperature detected by said temperature sensor is lowered to a predetermined level, said valve means places said air-conditioning and refrigerating refrigerant return passages in communication with each other.

* * * * *